(12) United States Patent
Gan

(10) Patent No.: US 9,995,971 B2
(45) Date of Patent: Jun. 12, 2018

(54) PIXEL STRUCTURE AND LIQUID CRYSTAL DISPLAY PANEL

(71) Applicant: SHENZHEN CHINA STAR OPTOELECTRONICS TECHNOLOGY CO., LTD., Shenzhen, Guangdong (CN)

(72) Inventor: Qiming Gan, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 220 days.

(21) Appl. No.: 14/773,354

(22) PCT Filed: Aug. 3, 2015

(86) PCT No.: PCT/CN2015/085951
§ 371 (c)(1),
(2) Date: Sep. 7, 2015

(87) PCT Pub. No.: WO2017/008355
PCT Pub. Date: Jan. 19, 2017

(65) Prior Publication Data
US 2017/0153504 A1    Jun. 1, 2017

(30) Foreign Application Priority Data
Jul. 16, 2015 (CN) .......................... 2015 1 0420618

(51) Int. Cl.
*G02F 1/1343*    (2006.01)
*G02F 1/1333*    (2006.01)
*G02F 1/1362*    (2006.01)

(52) U.S. Cl.
CPC .. *G02F 1/134309* (2013.01); *G02F 1/133345* (2013.01); *G02F 1/136286* (2013.01); *G02F 2201/123* (2013.01)

(58) Field of Classification Search
CPC .................................................. G02F 1/13409
See application file for complete search history.

(56) References Cited

U.S. PATENT DOCUMENTS

| 9,274,377 | B2 | 3/2016 | Chang |
| 2011/0149183 | A1 | 6/2011 | Cho et al. |
| 2012/0162559 | A1 | 6/2012 | Kim |
| 2014/0267994 | A1* | 9/2014 | Ryu .................. G02F 1/133707 349/141 |

(Continued)

FOREIGN PATENT DOCUMENTS

| CN | 103309071 A | 9/2013 |
| CN | 104570513 A | 4/2015 |
| CN | 104820323 A | 8/2015 |

*Primary Examiner* — Edmond Lau
(74) *Attorney, Agent, or Firm* — Soroker Agmon Nordman

(57) ABSTRACT

A pixel structure having a substrate, an insulating layer and a pixel electrode is disclosed. The pixel electrode has first sub-electrodes and second sub-electrodes. The first sub-electrodes are arranged on a first region of the insulating layer and spaced apart from each other, and the second sub-electrodes are continuously disposed on a second region of the insulating layer. The first region is a flat region of the insulating layer, and the second region is a grooved region of the insulating layer.

8 Claims, 2 Drawing Sheets

(56) References Cited

U.S. PATENT DOCUMENTS

| | | | |
|---|---|---|---|
| 2015/0085228 A1* | 3/2015 | Kang | G02F 1/133528 |
| | | | 349/98 |
| 2016/0202572 A1* | 7/2016 | Chang | G02F 1/133707 |
| | | | 349/106 |
| 2016/0291419 A1 | 10/2016 | Yeh et al. | |
| 2016/0370660 A1 | 12/2016 | Zhao | |

* cited by examiner

PIXEL STRUCTURE AND LIQUID CRYSTAL DISPLAY PANEL

FIELD OF THE INVENTION

The present invention relates to a liquid crystal display, and more particularly to a pixel structure and a liquid crystal display panel.

BACKGROUND OF THE INVENTION

With the development of display technology, people have become increasingly demanding display images, such as a display device to be expected with a larger viewing angle, so that users can watch at different locations to get a better viewing experience.

A pixel structure with multiple domains is generally used an existing polymer stabilized vertically aligned (PSVA) liquid crystal display device for expanding a viewing angle of the liquid crystal display device, such as each of the pixel structures having pixel electrodes in four extending directions, specifically shown in FIG. 1A and FIG. 1B. FIG. 1A is a schematic structural diagram of a pixel electrode of a pixel structure of an existing liquid crystal display device. FIG. 1B is a cross-sectional diagram which is taken along an A-A' sectional line in FIG. 1A. In these figures, number 11 is referred to a pixel electrode, number 12 is referred to an insulating layer and number 13 is referred to a substrate. The contrast and the viewing angle of the liquid crystal display device may be improved by the pixel structure described above.

Since the extending directions of the pixel electrode in each of the display domains of the pixel structure are different, thus if a plurality of display domains are required to produce, the production cost of the liquid crystal display device will be greatly enhanced.

Therefore, it is necessary to provide a pixel structure and a liquid crystal display panel to solve the problems existing in the conventional technology.

SUMMARY OF THE INVENTION

An object of the present invention is to provide a pixel structure and a liquid crystal display panel which are low producing cost and which a liquid crystal display device corresponding to has a larger viewing angle, so as to solve the technical problems of the greater producing cost and the smaller viewing angle of the existing pixel structure and the liquid crystal display panel.

In order to solve the above problems, the technical solution of the present invention is provided as follows:

An embodiment of the present invention provides a pixel structure, comprising: a substrate; an insulating layer disposed on the substrate; and a pixel electrode disposed on the insulating layer, connected with corresponding data lines and scan lines, and comprising: first sub-electrodes arranged on a first region of the insulating layer and spaced apart from each other; and second sub-electrodes continuously disposed on a second region of the insulating layer; wherein the first region is a flat region of the insulating layer and the second region is a grooved region of the insulating layer; wherein the second sub-electrodes includes grooved sub-electrodes disposed formed within grooves of the insulating layer, and protruded sub-electrodes formed on protrusions of the insulating layer; and the grooved sub-electrodes and the protruded sub-electrodes are connected to each other; and wherein the pixel structure has a first display domain, a second display domain, a third display domain and a fourth display domain, the first sub-electrodes of the first display domain and the first sub-electrodes of the second display domain are symmetrical to a first central line of the pixel electrode, the second sub-electrodes of the first display domain and the second sub-electrodes of the second display domain are symmetrical to the first central line of the pixel electrode, and the first central line is parallel to the data lines.

In the pixel structure of the present invention described, an extending direction of the grooved sub-electrodes, an extending direction of the protruded sub-electrodes and an extending direction of the first sub-electrodes are parallel to each other.

In the pixel structure of the present invention described, the first sub-electrodes of the third display domain and the first sub-electrodes of the fourth display domain are symmetrical to the first central line of the pixel electrode, and the second sub-electrodes of the third display domain and the second sub-electrodes of the fourth display domain are symmetrical to the first central line of the pixel electrode.

In the pixel structure of the present invention described, the first sub-electrodes of the first display domain and the first sub-electrodes of the third display domain are symmetrical to a second central line of the pixel electrode, the second sub-electrodes of the first display domain and the second sub-electrodes of the third display domain are symmetrical to the second central line of the pixel electrode, and the second central line is parallel to the scan lines.

In the pixel structure of the present invention described, the first sub-electrodes of the second display domain and the first sub-electrodes of the fourth display domain are symmetrical to the second central line of the pixel electrode, and the second sub-electrodes of the second display domain and the second sub-electrodes of the fourth display domain are symmetrical to the second central line of the pixel electrode.

An embodiment of the present invention provides a pixel structure, comprising: a substrate; an insulating layer disposed on the substrate; and a pixel electrode disposed on the insulating layer, connected with corresponding data lines and scan lines, and comprising: first sub-electrodes arranged on a first region of the insulating layer and spaced apart from each other; and second sub-electrodes continuously disposed on a second region of the insulating layer; wherein the first region is a flat region of the insulating layer, and the second region is a grooved region of the insulating layer.

In the pixel structure of the present invention described, the second sub-electrodes includes grooved sub-electrodes formed within grooves of the insulating layer and protruded sub-electrodes formed on protrusions of the insulating layer, and the grooved sub-electrodes and the protruded sub-electrodes are connected to each other.

In the pixel structure of the present invention described, an extending direction of the grooved sub-electrodes, an extending direction of the protruded sub-electrodes and an extending direction of the first sub-electrodes are parallel to each other.

In the pixel structure of the present invention described, the pixel structure has a first display domain, a second display domain, a third display domain and a fourth display domain, the first sub-electrodes of the first display domain and the first sub-electrodes of the second display domain are symmetrical to a first central line of the pixel electrode, the second sub-electrodes of the first display domain and the second sub-electrodes of the second display domain are symmetrical to the first central line of the pixel electrode, and the first central line is parallel to the data lines.

In the pixel structure of the present invention described, the first sub-electrodes of the third display domain and the first sub-electrodes of the fourth display domain are symmetrical to the first central line of the pixel electrode, and the second sub-electrodes of the third display domain and the second sub-electrodes of the fourth display domain are symmetrical to the first central line of the pixel electrode.

In the pixel structure of the present invention described, the first sub-electrodes of the first display domain and the first sub-electrodes of the third display domain are symmetrical to a second central line of the pixel electrode, the second sub-electrodes of the first display domain and the second sub-electrodes of the third display domain are symmetrical to the second central line of the pixel electrode, and the second central line is parallel to the scan lines.

In the pixel structure of the present invention described, the first sub-electrodes of the second display domain and the first sub-electrodes of the fourth display domain are symmetrical to the second central line of the pixel electrode, and the second sub-electrodes of the second display domain and the second sub-electrodes of the fourth display domain are symmetrical to the second central line of the pixel electrode.

An embodiment of the present invention further provides a liquid crystal display panel, comprising: data lines configured to transmit data signals; scan lines configured to transmit scanning signals; and a pixel structure formed by the data lines and the scan lines crossed each other, comprising: a substrate; an insulating layer disposed on the substrate; and a pixel electrode disposed on the insulating layer, connected with the data lines and scan lines, and comprising: first sub-electrodes arranged on a first region of the insulating layer and spaced apart from each other; and second sub-electrodes continuously disposed on a second region of the insulating layer; and wherein the first region is a flat region of the insulating layer, and the second region is a grooved region of the insulating layer.

In the liquid crystal display panel of the present invention described, the second sub-electrodes includes grooved sub-electrodes formed within grooves of the insulating layer and protruded sub-electrodes formed on protrusions of the insulating layer, and the grooved sub-electrodes and the protruded sub-electrodes are connected to each other.

In the liquid crystal display panel of the present invention described, an extending direction of the grooved sub-electrodes, an extending direction of the protruded sub-electrodes and an extending direction of the first sub-electrodes are parallel to each other.

In the liquid crystal display panel of the present invention described, the pixel structure has a first display domain, a second display domain, a third display domain and a fourth display domain, the first sub-electrodes of the first display domain and the first sub-electrodes of the second display domain are symmetrical to a first central line of the pixel electrode, the second sub-electrodes of the first display domain and the second sub-electrodes of the second display domain are symmetrical to the first central line of the pixel electrode, and the first central line is parallel to the data lines.

In the liquid crystal display panel of the present invention described, the first sub-electrodes of the third display domain and the first sub-electrodes of the fourth display domain are symmetrical to the first central line of the pixel electrode, and the second sub-electrodes of the third display domain and the second sub-electrodes of the fourth display domain are symmetrical to the first central line of the pixel electrode.

In the liquid crystal display panel of the present invention described, the first sub-electrodes of the first display domain and the first sub-electrodes of the third display domain are symmetrical to a second central line of the pixel electrode, the second sub-electrodes of the first display domain and the second sub-electrodes of the third display domain are symmetrical to the second central line of the pixel electrode, and the second central line is parallel to the scan lines.

In the liquid crystal display panel of the present invention described, the first sub-electrodes of the second display domain and the first sub-electrodes of the fourth display domain are symmetrical to the second central line of the pixel electrode, and the second sub-electrodes of the second display domain and the second sub-electrodes of the fourth display domain are symmetrical to the second central line of the pixel electrode.

In comparison with the existing pixel structure and the liquid crystal display panel, the first sub-electrodes and the second sub-electrodes with different structures are configured for the pixel structure and the liquid crystal display panel of the present invention, so as to improve the viewing angle of the liquid crystal display panel on the basis of keeping the producing cost of the existing liquid crystal display device. The technical problems of the greater producing cost and the smaller viewing angle of the existing pixel structure and the liquid crystal display panel are solved.

To make the above description of the present invention can be more clearly comprehensible, description below in examples of preferred embodiments with the accompanying drawings, described in detail below.

DETAILED DESCRIPTION OF THE PREFERRED EMBODIMENTS

The following description of the embodiments with reference to the appended drawings is used for illustrating specific embodiments, which may be used for carrying out, of the present invention. The directional terms described by the present invention, such as upper, lower, front, back, left, right, inner, outer, side, and etc., are only directions by referring to the accompanying drawings. Thus, the used directional terms are used to describe and understand the present invention, but the present invention is not limited thereto.

In figures, elements with similar structures are indicated as the same numbers.

Figure 1A:
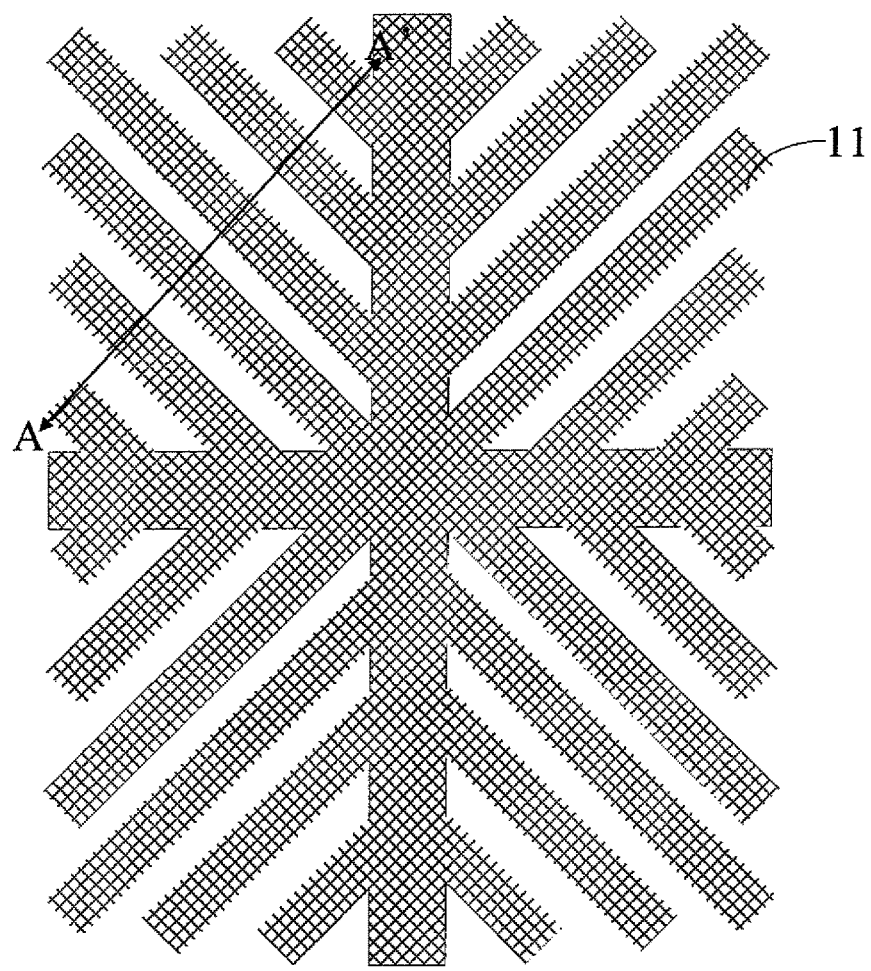
FIG. 1A is a schematic structural diagram of a pixel electrode of a pixel structure of an existing liquid crystal display device.
Figure 1B:
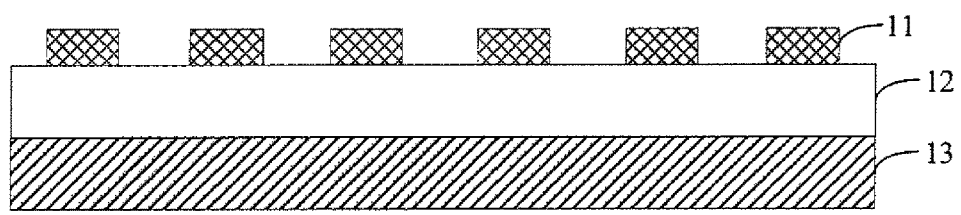
FIG. 1B is a cross-sectional diagram which is taken along an A-A' sectional line in FIG. 1A.
Figure 2A:
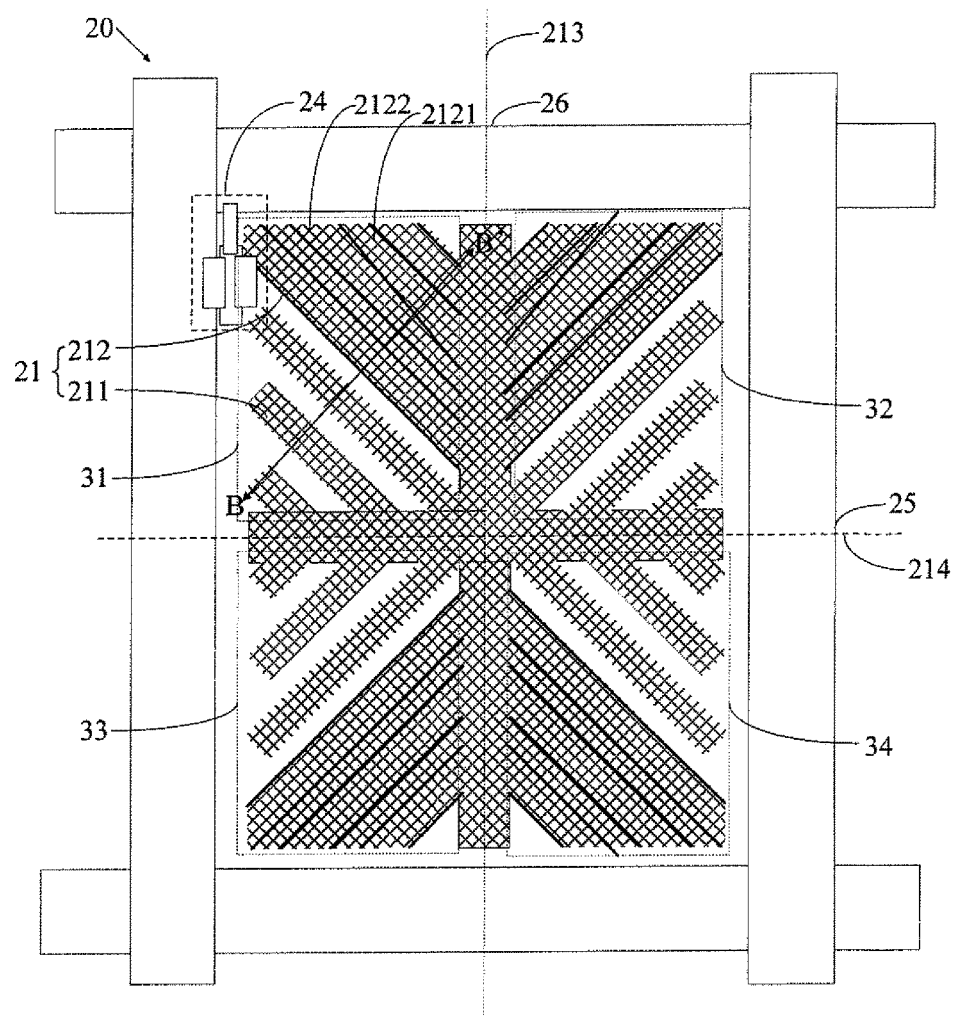
FIG. 2A is a schematic structural diagram of a pixel electrode of a pixel structure of a liquid crystal display device of the present invention.
Figure 2B:
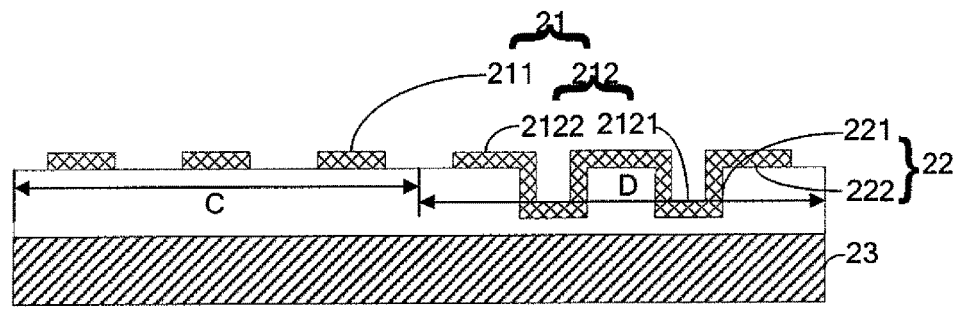
FIG. 2B is a cross-sectional diagram which is taken along a B-B' sectional line in FIG. 2A.

Please referring to FIG. 2A and FIG. 2B, FIG. 2A is a schematic structural diagram of a pixel electrode of a pixel structure of a liquid crystal display device of the present invention. FIG. 2B is a cross-sectional diagram which is taken along a B-B' sectional line in FIG. 2A. A pixel structure 20 of the present preferred embodiment comprises a substrate 23, an insulating layer 22 and a pixel electrode 21, wherein other parts of the pixel structure 20, such as a metal layer, an insulating layer and the like which are used for making a thin film transistor, are omitted. Structures of other parts of the pixel structure 20 are the same with those of corresponding parts of a pixel structure in the existing technique.

The insulating layer 22 is disposed on the substrate 23, and the pixel electrode 21 is disposed on the insulating layer 22 and connected with corresponding data lines 25 and scan lines 26 of the liquid crystal display panel. In the present preferred embodiment, the pixel electrode 21 comprises first sub-electrodes 211 and second sub-electrodes 212. The first sub-electrodes 211 are arranged on a first region C of the insulating layer 22 and spaced apart from each other, and the second sub-electrodes 212 are continuously disposed on a second region D of the insulating layer 22. The first region C is a flat region of the insulating layer 22 and the second region D is a grooved region of the insulating layer 22, which means that the insulating layer 22 of the first region C is all located in a single level and the insulating layer 22 of the second region D is located in at least two levels, i.e., the insulating layer 22 of the second region D comprises grooves 221 and protrusions 222.

The second sub-electrodes 212 includes grooved sub-electrodes 2121 disposed formed within the grooves 221 of the insulating layer 22, and protruded sub-electrodes 2122 formed on protrusions 222 of the insulating layer 22, wherein the grooved sub-electrodes 2121 and the protruded sub-electrodes 2122 in the same display domain are connected to each other. The grooves 221 and the protrusions 222 in the insulating layer 22 of the second region D are formed in strip distribution, and therefore the grooved sub-electrodes 2121 disposed formed within the grooves 221, the protruded sub-electrodes 2122 disposed on the protrusions 222 are also formed in strip distribution, and the first sub-electrodes 211 arranged on the insulating layer of the first region C, which are spaced apart from each other, are also formed in strip distribution. An extending direction of the grooved sub-electrodes 2121, an extending direction of the protruded sub-electrodes 2122 and an extending direction of the first sub-electrodes 211 are parallel to each other.

As shown in FIG. 2A, the pixel structure 20 in the present preferred embodiment has a first display domain 31, a second display domain 32, a third display domain 33 and a fourth display domain 34, the first sub-electrodes 211 of the first display domain 31 and the first sub-electrodes 211 of the second display domain 32 are symmetrical to a first central line 213 of the pixel electrode 21, the second sub-electrodes 212 of the first display domain 31 and the second sub-electrodes 212 of the second display domain 21 are symmetrical to the first central line 213 of the pixel electrode 21, the first sub-electrodes 211 of the third display domain 33 and the first sub-electrodes 211 of the fourth display domain 34 are symmetrical to the first central line 213 of the pixel electrode 21, and the second sub-electrodes 212 of the third display domain 33 and the second sub-electrodes 212 of the fourth display domain 34 are symmetrical to the first central line 213 of the pixel electrode 21, wherein the first central line 213 is parallel to the data lines 25 of the liquid crystal display panel.

The first sub-electrodes 211 of the first display domain 31 and the first sub-electrodes 211 of the third display domain 33 are symmetrical to a second central line 214 of the pixel electrode 21, the second sub-electrodes 212 of the first display domain 31 and the second sub-electrodes 212 of the third display domain 33 are symmetrical to the second central line 214 of the pixel electrode 21, the first sub-electrodes 211 of the second display domain 32 and the first sub-electrodes 211 of the fourth display domain 24 are symmetrical to the second central line 214 of the pixel electrode 21, and the second sub-electrodes 212 of the second display domain 32 and the second sub-electrodes 212 of the fourth display domain 34 are symmetrical to the second central line 214 of the pixel electrode 21, wherein the second central line 214 is parallel to the scan lines 26 of the liquid crystal display panel.

When the pixel electrode 21 of the pixel structure 20 of the present preferred embodiment is applied the same voltage, liquid molecules corresponding to each of the display domains all have the same oblique direction. However, since an electric field formed by the first sub-electrodes 211 and the second sub-electrodes 212 of each of the display domains have differences, such that the liquid molecules corresponding to the first sub-electrodes 211 and those corresponding to the second sub-electrodes 212 of the same display domain have different oblique angles, so as to implement two sub-display domains in the same display domain for the pixel structure in FIG. 2A having eight different sub-display domains and improve the viewing angle of the liquid crystal display panel effectively. Simultaneously, the first sub-electrodes 211 and the second sub-electrodes 212 can be formed at the same time, and the producing cost of the liquid crystal display panel is not increased. Therefore, the viewing angle of the liquid crystal display panel is enlarged on the basis of ensuring the producing cost of the existing liquid crystal display panel.

The pixel structure of the present preferred embodiment has the first sub-electrodes and the second sub-electrodes with different structures for improving the viewing angle of the liquid crystal display device on the basis of keeping the producing cost of the existing liquid crystal display device.

The present invention further provides a liquid crystal display panel, wherein the liquid crystal display panel comprises data lines, scan lines and a pixel structure. The data lines are configured to transmit data signals. The scan lines are configured to transmit scanning signals. The pixel structure are formed by the data lines and the scan lines crossed each other and comprises a substrate, an insulating layer and a pixel electrode, wherein the insulating layer is disposed on the substrate, and the pixel electrode is disposed on the insulating layer and connected with the data lines and scan lines corresponding to the liquid crystal display panel.

The pixel electrode comprises first sub-electrodes and second sub-electrodes. The first sub-electrodes are arranged on a first region of the insulating layer and spaced apart from each other, and the second sub-electrodes are continuously disposed on a second region of the insulating layer. The first region is a flat region of the insulating layer, and the second region is a grooved region of the insulating layer.

Preferably, the second sub-electrodes includes grooved sub-electrodes formed within grooves of the insulating layer and protruded sub-electrodes formed on protrusions of the insulating layer, and the grooved sub-electrodes and the protruded sub-electrodes are connected to each other.

Preferably, an extending direction of the grooved sub-electrodes, an extending direction of the protruded sub-electrodes and an extending direction of the first sub-electrodes are parallel to each other.

Preferably, the pixel structure has a first display domain, a second display domain, a third display domain and a fourth display domain, the first sub-electrodes of the first display domain and the first sub-electrodes of the second display domain are symmetrical to a first central line of the pixel electrode, the second sub-electrodes of the first display domain and the second sub-electrodes of the second display domain are symmetrical to the first central line of the pixel electrode, the first sub-electrodes of the third display domain and the first sub-electrodes of the fourth display domain are symmetrical to the first central line of the pixel electrode, and the second sub-electrodes of the third display domain and the second sub-electrodes of the fourth display domain are symmetrical to the first central line of the pixel electrode, wherein the first central line is parallel to the data lines of the liquid crystal display panel.

Preferably, the first sub-electrodes of the first display domain and the first sub-electrodes of the third display domain are symmetrical to a second central line of the pixel electrode, the second sub-electrodes of the first display domain and the second sub-electrodes of the third display domain are symmetrical to the second central line of the pixel electrode, the first sub-electrodes of the second display domain and the first sub-electrodes of the fourth display domain are symmetrical to the second central line of the pixel electrode, and the second sub-electrodes of the second display domain and the second sub-electrodes of the fourth display domain are symmetrical to the second central line of the pixel electrode, wherein the second central line is parallel to the scan lines of the liquid crystal display panel.

A specific working principle of the liquid crystal display panel of the present preferred embodiment is the same with or similar to the description of the pixel structure described above in the preferred embodiment, which is referred to the related description of the pixel structure described above in the preferred embodiment.

The pixel structure of the present preferred embodiment has the first sub-electrodes and the second sub-electrodes with different structures for improving the viewing angle of the liquid crystal display device on the basis of keeping the producing cost of the existing liquid crystal display device. The technical problems of the greater producing cost and the smaller viewing angle of the existing pixel structure and the liquid crystal display panel are solved.

According to the above, although the present invention has been described in a preferred embodiment described above, preferred embodiments described above are not intended to limit the invention, one of ordinary skill in the art without departing from the spirit and scope of the invention within, can make various modifications and variations, so the range of the scope of the invention defined by the claims prevail.

What is claimed is:

1. A pixel structure, comprising:
   a substrate;
   an insulating layer disposed on the substrate; and
   a pixel electrode disposed on the insulating layer, connected with corresponding data lines and scan lines, and comprising:
      first sub-electrodes arranged on a first region of the insulating layer and spaced apart from each other; and
      second sub-electrodes continuously disposed on a second region of the insulating layer;
   wherein the first region is a flat region of the insulating layer and the second region is a grooved region of the insulating layer;
   wherein the second sub-electrodes includes grooved sub-electrodes disposed formed within grooves of the insulating layer, and protruded sub-electrodes formed on protrusions of the insulating layer; and the grooved sub-electrodes and the protruded sub-electrodes are connected to each other;
   wherein the pixel structure has a first display domain, a second display domain, a third display domain and a fourth display domain, the first sub-electrodes of the first display domain and the first sub-electrodes of the second display domain are symmetrical to a first central line of the pixel electrode, the second sub-electrodes of the first display domain and the second sub-electrodes of the second display domain are symmetrical to the first central line of the pixel electrode, and the first central line is parallel to the data lines; and
   wherein in each of the first display domain, the second display domain, the third display domain and the fourth display domain, an extending direction of the grooved sub-electrodes, an extending direction of the protruded sub-electrodes, and an extending direction of the first sub-electrodes are parallel to each other.

2. The pixel structure according to claim 1, wherein the first sub-electrodes of the third display domain and the first sub-electrodes of the fourth display domain are symmetrical to the first central line of the pixel electrode, and the second sub-electrodes of the third display domain and the second sub-electrodes of the fourth display domain are symmetrical to the first central line of the pixel electrode.

3. The pixel structure according to claim 1, wherein the first sub-electrodes of the first display domain and the first sub-electrodes of the third display domain are symmetrical to a second central line of the pixel electrode, the second sub-electrodes of the first display domain and the second sub-electrodes of the third display domain are symmetrical to the second central line of the pixel electrode, and the second central line is parallel to the scan lines.

4. The pixel structure according to claim 3, wherein the first sub-electrodes of the second display domain and the first sub-electrodes of the fourth display domain are symmetrical to the second central line of the pixel electrode, and the second sub-electrodes of the second display domain and the second sub-electrodes of the fourth display domain are symmetrical to the second central line of the pixel electrode.

5. A liquid crystal display panel, comprising:
   data lines configured to transmit data signals;
   scan lines configured to transmit scanning signals; and
   a pixel structure formed by the data lines and the scan lines crossed each other, comprising:
      a substrate;
      an insulating layer disposed on the substrate; and
      a pixel electrode disposed on the insulating layer, connected with the data lines and scan lines, and comprising:
         first sub-electrodes arranged on a first region of the insulating layer and spaced apart from each other; and
         second sub-electrodes continuously disposed on a second region of the insulating layer,
      wherein the first region is a flat region of the insulating layer, and the second region is a grooved region of the insulating layer
      wherein the pixel structure has a first display domain, a second display domain, a third display domain, and a fourth display domain, the first sub-electrodes of the first display domain and the first sub-electrodes of the second display domain are symmetrical to a first central line of the pixel electrode, the second sub-electrodes of the first display domain and the second sub-electrodes of the second display domain are symmetrical to the first central line of the pixel electrode, and the first central line is parallel to the data lines;

wherein the second sub-electrodes includes grooved sub-electrodes formed within grooves of the insulating layer and protruded sub-electrodes formed on protrusions of the insulating layer, and the grooved sub-electrodes and the protruded sub-electrodes are connected to each other; and wherein in each of the first display domain, the second display domain, the third display domain and the fourth display domain, an extending direction of the grooved sub-electrodes, an extending direction of the protruded sub-electrodes, and an extending direction of the first sub-electrodes are parallel to each other.

6. The liquid crystal display panel according to claim 5, wherein the first sub-electrodes of the third display domain and the first sub-electrodes of the fourth display domain are symmetrical to the first central line of the pixel electrode, and the second sub-electrodes of the third display domain and the second sub-electrodes of the fourth display domain are symmetrical to the first central line of the pixel electrode.

7. The liquid crystal display panel according to claim 5, wherein the first sub-electrodes of the first display domain and the first sub-electrodes of the third display domain are symmetrical to a second central line of the pixel electrode, the second sub-electrodes of the first display domain and the second sub-electrodes of the third display domain are symmetrical to the second central line of the pixel electrode, and the second central line is parallel to the scan lines.

8. The liquid crystal display panel according to claim 5, wherein the first sub-electrodes of the second display domain and the first sub-electrodes of the fourth display domain are symmetrical to a second central line of the pixel electrode, and the second sub-electrodes of the second display domain and the second sub-electrodes of the fourth display domain are symmetrical to the second central line of the pixel electrode.

* * * * *